United States Patent [19]

Duncan

[11] Patent Number: 4,567,685

[45] Date of Patent: Feb. 4, 1986

[54] SIMULATED FROG FISHING LURE

[76] Inventor: Samuel E. Duncan, 1514 Hidden Hills Dr., Clinton, Tenn. 37716

[21] Appl. No.: 477,350

[22] Filed: Mar. 21, 1983

[51] Int. Cl.$^4$ ............................................. A01K 85/00
[52] U.S. Cl. ..................................... 43/42.15; 43/42.3
[58] Field of Search ............................. 43/42.15, 42.3

[56] References Cited

U.S. PATENT DOCUMENTS

| | | | |
|---|---|---|---|
| 1,791,316 | 2/1931 | Jordan | 43/42.15 |
| 1,833,522 | 11/1931 | Goble | 43/42.15 |
| 1,849,434 | 3/1932 | Page | 43/42.3 |
| 2,478,655 | 8/1949 | Davis | 43/42.3 |
| 2,867,933 | 1/1959 | Stookey | 43/42.02 |

FOREIGN PATENT DOCUMENTS 942497 2/1974 Canada ................................... 43/55

Primary Examiner—Gene P. Crosby
Attorney, Agent, or Firm—Herman L. Holsopple

[57] ABSTRACT

A combination top water and under water fishing lure resembling a frog is described. The lure has a buoyant body portion moveably joined to a weighted hind leg portion which simulates a live frog at rest. The body portion is weighted at its posterior end whereby the anterior end or head end is maintained at an upright position in the water. A plastic dive plate attached to the anterior end of the body portion provides realistic kicking and diving action together with erratic head movement of the simulated frog being retrieved beneath the water's surface. The invention simulates the natural appearance of a frog in both swimming and at-rest modes.

1 Claim, 4 Drawing Figures

SIMULATED FROG FISHING LURE

BACKGROUND OF THE INVENTION

The invention described herein relates generally to fishing lures and, more specifically, pertains to a floating lure resembling a frog at rest and which, on retrieval through water, dives to simulate a swimming frog thereby catching the attention of game fish such as large-mouth and small-mouth bass who normally feed on live frogs.

It has long been known by sport fishermen that frogs and similar leaping amphibians are readily consumed by many species of game fish. Consequently, in the past, several attempts have been made to try to construct an artificial bait which would simulate the action of a live frog.

Among patents which utilize the appearance of frog-like fish lures are U.S. Pat. No. 1,833,522 which describes an artificial bait designed to wobble back and forth when it is drawn through water; U.S. Pat. No. 1,849 434 which relates to an artificial bait resembling a frog and having hind legs which rise or fall according to the tension on the line drawing the bait; U.S. Pat. No. 2,478,655 which comprises a fishing lure having articulated members that move to simulate the motions of a frog; U.S. Pat. No. 2,867,933 a fish lure which simulates a live frog; and Canadian Pat. No. 942,497 which provides a jointed fishing lure to simulate the action of a frog when it is drawn in the water. None of the foregoing lures have the life-like action and features of the frog lure described herein and are cited for background information only.

OBJECTIVES OF THE INVENTION

It is, therefore, the primary object of this invention to provide a top water and under water simulated frog fishing lure for use by sport or game fishermen which will, when floating on the surface of water, resemble a frog at rest and which will, when being retrieved, simulate the natural swimming motion of a frog or other amphibian creature.

It is another object of the invention to provide a fishing lure having two articulated members but which has no complicated mechanical components.

It is a further object of the invention to provide a lure resembling a frog having two portions moveably joined together comprising a hind leg portion weighted to hang down at an approximate 90° angle to a body portion weighted whereby the anterior end of said body portion is maintained in an upright position thereby simulating a real frog at rest.

It is still another object of the invention to provide an articulated fishing lure constructed whereby the leg portion can move freely in both vertical and lateral directions to more closely resemble the kicking movement of a live swimming frog and whereby the vertical movement is 0°–90° and said lateral movement is 25°–30°.

It is yet another object of this invention to provide a floating fishing lure having a protruding lip or dive plate attached to the anterior end of the body portion which contributes to both the diving action as well as the erratic head and leg movement of the simulated frog when the lure is being retrieved.

It is an additional object of the invention to provide an artificial bait which, when attached to a fishing line and being retrieved by means of a reel on a fishing rod, will dive beneath the surface of the pond, lake or other aquatic environment in which fish are found, whereupon the leg portion of the lure will immediately and automatically elevate to essentially the same plane of the body portion as the force of the water overcomes the weight of the legs, thereby simulating a swimming frog.

Further features and objectives of the invention will become apparent on an examination of the accompanying specifications and drawings wherein like numbers refer to like parts throughout, and which will assist in explaining the invention.

DESCRIPTION OF THE PREFERRED EMBODIMENT

Figure 1:
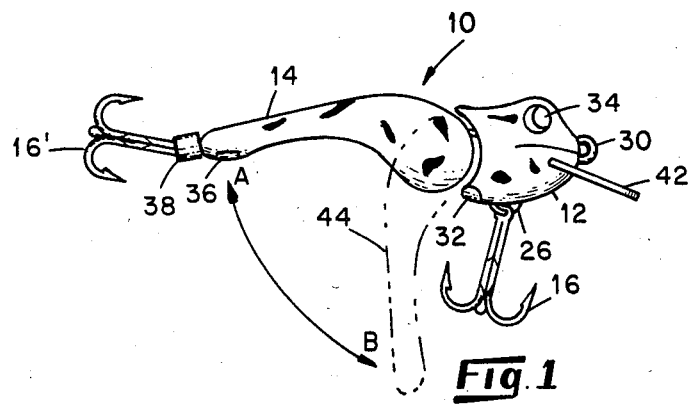
FIG. 1 is a side view of the subject lure in the retrieval position showing the leg portion thereof elevated to the same plane as the body portion; also in FIG. 1, in phantom, the leg portion is shown in the rest position.

Referring now to the drawings, wherein like numbers refer to similar parts of the several views, fishing lure 10 is seen to be comprised of two moveably joined sections or portions which simulate the appearance of a frog, and having a body portion 12 and hind leg portion 14, said portions being preferably formed of balsa wood or other buoyant material having a specific gravity of less than 1.0 whereby the lure, at rest, will float upon the surface of the water.

Figure 3:
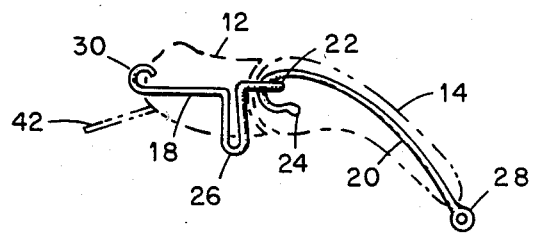
FIG. 3 is a cross-sectional side view of the invention showing construction details of the linkage device which joins the two moveable portions of the lure.
Figure 4:
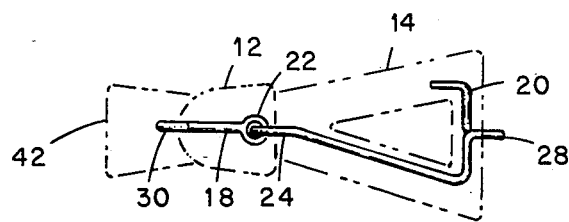
FIG. 4 is a cross-sectional top plan view showing the linkage device of FIG. 3.

In the preferred embodiment of the invention, treble hooks 16, 16' are secured to lure 10 by means of stiff wires 18, 20 mounted within said body portion 12 and leg portion 14, respectively. As seen in FIGS. 3, 4, wires 18, 20 are formed whereby a closed loop 22 at the posterior end of wire 18 interconnects with an open crook 24 in the anterior end of wire 20 thereby providing the hinge that enables the two portions 12, 14 to move up-and-down and side-to-side with respect to each other. It is important that closed loop 22 and crook 24 be large enough to allow complete freedom of movement whereby body portion 12 and leg portion 14 can rotate laterally 25°–30° and vertically 0°–90° with respect to each other. Wires 18, 20 are further provided with a loop 26, 28, respectively, whereby treble hooks 16, 16' are attached thereto. A closed loop 30 in the anterior end of wire 18 provides a point of attachment for a fishing line (not shown) by which lure 10 is deployed.

The manner in which body portion 12 and leg portion 14 are constructed can be seen in FIGS. 3 and 4. In the cross-sectional side view of FIG. 3 and top view of FIG. 4 it is seen that stiff wires 18, 20 are imbedded in body portion 12 and leg portion 14, respectively. For this purpose, a recessed groove is machined or carved into said body portion 12 and leg portion 14 to a depth sufficient to accommodate, respectively, wires 18, 20 whereupon a plastic sealant or other appropriate filler material is used to fill up the recessed groove after which the lure can then be sanded and painted to assume the appearance shown in FIGS. 1 and 2.

Figure 2:
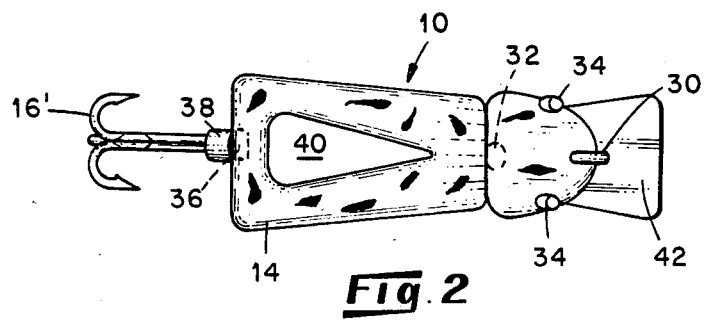
FIG. 2 is a top plan view of the lure shown in FIG. 1.

It is important to the construction of the subject lure that certain weights be installed in body portion 12 and leg portion 14 in the positions shown in FIGS. 1, 2 whereby lure 10 assumes the natural appearance of a frog. One-half of a No. 7 lead shot 32 is sealed by means of epoxy or other cement on the lower posterior side of body portion 12 whereby the anterior end of body portion 12 having eyes 34 and closed loop 30 of wire 18 located thereon is rotated upward with respect to leg portion 14 when lure 10 is at rest. One No. 7 lead shot 36 is sealed by means of an epoxy cement to the lower posterior side of leg portion 14 whereby gravity will thereupon cause said leg portion 14 to dangle at a lifelike angle under body portion 12 when lure 10 is floating at rest. The placement of the weights 32, 36 can, of course, be adjusted to achieve optimum lure action.

A spacer cup 38 may be provided adjacent to loop 28 in wire 20 whereby treble hook 16' is prevented from rotating into the open area 40 in leg portion 14. A lip or dive plate 42 which may be conveniently made of plastic, projects at an angle of 15°–45° below horizontal from the anterior end of body portion 12 whereby, on retrieval, lure 10 is caused to dive below the surface of the water at which point leg portion 14 projects in a direction more or less straight behind body portion 12. The resistance to the water provided by dive plate 42 when the lure is being retrieved through the water then causes both body portion 12 and leg portion 14 to move freely and unhindered with leg portion 14 appearing to stretch out as lure 10 picks up speed and then, as lure 10 slows down, leg portion 14 slowly drops in the direction shown by arrow A-B, FIG. 1, to a more or less vertical position in the manner of a frog at rest as seen in phantom 44, FIG. 1. As the aforedescribed lure is retrieved through water, a vibratory noise is produced when body portion 12 oscillates against leg portion 14 thereby providing a further attraction for nearby fish. By removing dive plate 42, the subject lure may be used exclusively for top water fishing.

It is understood that, in addition to the use of conventional fishhooks comprising the usual straight, rigid shank having an eye at one end thereof and a curvate or rounded single or multiple-barbed hook at the other end thereof, it is also common practice to use so-called weedless hooks with this invention. Such hooks comprise a looped wire construction over the point of the hook to prevent weeds or other debris from attaching thereto, yet has a spring action by which a fish can overcome the hook's protection.

Thus, in summary, a fishing lure is described which, when floating, resembles a frog at rest and which, when retrieved through water, dives to simulate a swimming frog thereby catching the attention of bass or other game fish.

A preferred embodiment of this invention has been set forth in the descriptions and drawings. These descriptions are used in the generic sense only and not for purposes of limitation. Various changes may, therefore, be made therein without departing from the spirit and scope of the invention.

What is claimed is:

1. An articulated fishing lure to represent the natural appearance of a frog in at-rest and swimming modes in water, comprising: a buoyant body portion, said body portion having an anterior head end and a concaved posterior end, said body portion having a lead shot weight sealably mounted on the lower posterior side thereof, said lead shot weight of said body portion providing means for maintaining the buoyant body portion in an upright natural appearing position; a hind leg portion having anterior and posterior ends said hind leg anterior end having a transversally oriented cylindrical shape in general mating relation relative to said concaved posterior end of said body portion, said hind leg portion in plan view having continuous borders with a central triangular shaped opening and with said posterior end having a greater width than said anterior end; wire means for attaching the buoyant body portion to the hind leg portion in tandem; said hind leg portion having a lead shot weight sealably mounted to the lower posterior side thereof; said lead shot weight of said hind leg portion providing means for maintaining the hind leg portion at an approximate 90° angle to the buoyant body portion when the lure is in the at-rest mode; said anterior head end having a protruding plastic lip fixedly attached thereto at an angle of 15°–45° below horizontal; said protruding lip providing means for causing said lure to dive below the surface of the water on retrieval of said lure and whereby said hind leg portion is extended horizontally with respect to the body portion to simulate the movement of a frog.

* * * * *